July 12, 1927.                    C. A. PRIEST                    1,635,766
                                 DENTAL MACHINERY
                               Filed Oct. 1, 1926
FIG. 1
FIG. 3
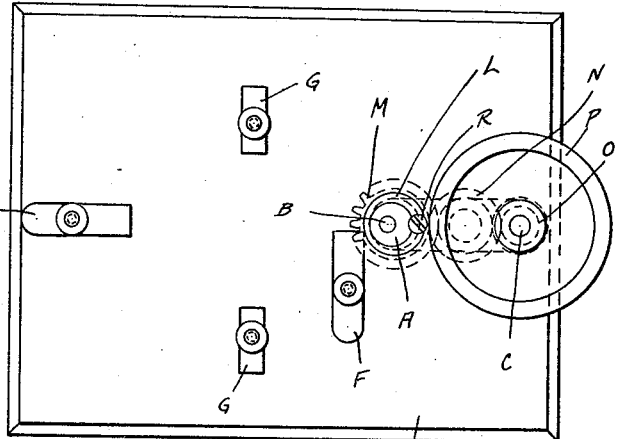
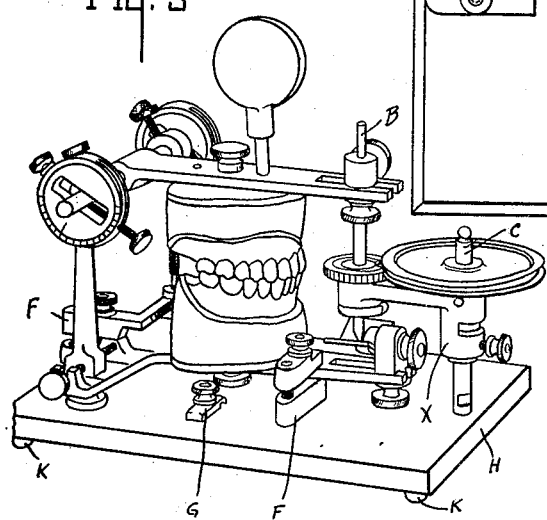
FIG. 2
FIG. 4
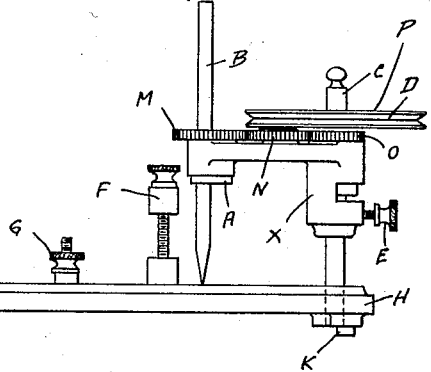
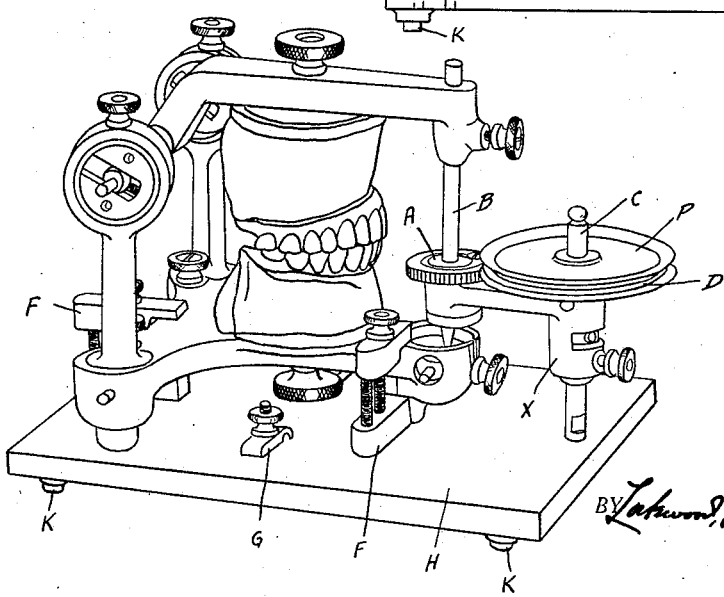
INVENTOR.
CHARLES A. PRIEST.
ATTORNEYS.

Patented July 12, 1927.

1,635,766

UNITED STATES PATENT OFFICE.

CHARLES A. PRIEST, OF MARION, INDIANA.

DENTAL MACHINERY.

Application filed October 1, 1926. Serial No. 138,912.

My invention relates to dental grinding machines and more particularly to such as are designed for use in the finishing work on false teeth. It has for its object the application of such devices in a more convenient and effective manner than has hitherto been known. In the accompanying drawings I have shown my invention as related to a belt driven machine and in such simple form as will allow any one skilled in the art to readily understand the novelty thereof but my invention is in no way restricted to such relation, nor to the exact details as illustrated and described.

Figure 1 is the top view of one form of my invention.

Figure 2 is a front view, in elevation, of the same form.

Fig. 3 is a perspective view of one commercial form of articulator and the invention applied thereto. Fig. 4 is a similar view of another commercial form of articulator and the invention applied thereto.

My invention provides a mandibular motion to the movable portion of any anatomical dental articulator from a rotating shaft or other source of power by simple and economical means.

In Figure 1 is shown the eccentric bushing A which is mounted within the rotating shaft L to which is rigidly attached the gear M. This gear meshes with gear N which is driven by gear O. The pulley P is rigidly attached and concentric with the gear O and is connected with the source of power by means of a belt. The eccentric bushing A is rotatably mounted within the gear shaft L and is held in fixed relation thereto by means of the set screw R.

In Figure 2, the base H is shown on which rests the dental articulator to be operated. The articulator is held in place by the clamps F or G dependent on the particular type of articulator used. The rod B which is a part of said articulator and is rigidly fastened to the movable part thereof, passes through the eccentric bushing A of my machine. When the power is applied to pulley P, the rod B is moved in circle in a plane parallel to the base H, and the movable portion of said articulator is thus given the proper movement.

The entire set of gears, pulley, etc. supported by bracket or block X is adjustably mounted along the rod C in a line parallel with the axis of said eccentric bushing and is held in position by the set screw E. To the base H are attached the rubber feet K.

While I have shown my invention in the particular form for belt drive, it is not my intention to limit my claims to such construction but to include other methods of drive and forms of mounting.

Having thus described my invention, what I claim is new and desire to secure by Letters Patent is:

1. A device of the class described having a set of gears mounted on suitable block, an eccentric bushing mounted eccentrically within the driven gear, a set screw holding said eccentric bushing in any desired position relative to said gear, a pulley directly connected to the driving gear substantially as described.

2. A device of the class described having a set of gears mounted on a suitable block, a pulley directly connected to the driving gear, an eccentric bushing eccentrically mounted within the driven gear, a set screw holding said bushing in fixed position relative to said gear, means for adjustably mounting said block with said gears on suitable rod parallel to the axis of said eccentric bushing substantially as described.

3. A device for producing mandibular motion in an articulator comprising a base for detachably supporting an articulator having a pin, a support for the articulator pin, mechanism moving said support to secure circular movement of the articulator pin about an axis eccentric to the pin axis, and an adjustable support on said base for supporting said moving mechanism.

4. A device as defined by claim 6, wherein the pin support includes an eccentric bushing and a shaft adjustably but rigidly mounting the same.

5. A device as defined by claim 6, wherein the pin support includes an eccentric bushing and a shaft adjustably but rigidly mounting the same and by the moving mechanism including a rotating pulley and gear connection for rotating said shaft.

6. A device for producing mandibular movement in an articulator having a pin, comprising an articulator supporting base, a bracket adjustably supported thereon for movement parallel thereto, a shaft rotatable in said bracket, means for rotating said shaft, a pin support in the form of an eccentric member coaxial with said shaft, and means for securing said eccentric member and shaft together for simultaneous movement and circular movement of the pin about an axis eccentric to the pin axis.

In testimony whereof I hereunto subscribe my name this 25th day of September, 1926.

CHARLES A. PRIEST.